United States Patent [19]

Nakajima et al.

[11] Patent Number: 4,547,402
[45] Date of Patent: Oct. 15, 1985

[54] METHOD OF INCREASING THE THERMAL SHOCK RESISTANCE OF PHOSPHATE LASER GLASS

[75] Inventors: Sadahiro Nakajima; Chiemi Kanamori; Hisayoshi Toratani, all of Tokyo, Japan

[73] Assignee: Hoya Corporation, Tokyo, Japan

[21] Appl. No.: 673,403

[22] Filed: Nov. 20, 1984

[30] Foreign Application Priority Data

Dec. 19, 1983 [JP] Japan ................................ 58-237760

[51] Int. Cl.$^4$ .......................... B05D 1/18; B05D 3/02; C03C 17/02; G02B 1/10
[52] U.S. Cl. ....................................... 427/169; 372/40
[58] Field of Search ........................... 427/169; 372/40

[56] References Cited

U.S. PATENT DOCUMENTS 4,075,120 2/1978 Myers et al. ..................... 372/40 X Primary Examiner—James R. Hoffman
Attorney, Agent, or Firm—Cushman, Darby & Cushman

[57] ABSTRACT

A method of increasing the thermal shock resistance of a phosphate laser glass is described, comprising coating the surface of the glass with a sol solution which is prepared by hydrolyzing at least one organometallic compound dissolved in an organic solvent and then partially polycondensing, and then heat-treating to form a glassy coating on the surface of the glass. The phosphate laser glass having such increased thermal shock resistance is useful for high repetitive operation.

7 Claims, No Drawings

METHOD OF INCREASING THE THERMAL SHOCK RESISTANCE OF PHOSPHATE LASER GLASS

FIELD OF THE INVENTION

The present invention relates to a method of increasing the thermal shock resistance of a phosphate laser glass. More particularly, it is concerned with a method of increasing the thermal shock resistance and rupture strength of a phosphate laser glass against light pumping by forming a glassy coating on the surface thereof.

BACKGROUND OF THE INVENTION

A demand for high repetitive operation recently increases in a glass laser. Phosphate laser glass has a narrow spectral width and is very suitable for such a use. If, however, the high repetitive operation is carried out, heat from a flash lamp as a pumping light source is accumulated in the glass, resulting in increasing the temperature of the glass. To lower the temperature of the glass, therefore, water cooling or air cooling is usually applied. However, since the thermal conductivity of glass is small as compared with that of crystals, even if water cooling, for example, is applied, the heat accumulated in the inside of the glass is difficult to diffuse to the cooling medium. As a result, a large temperature distribution tends to occur in the glass. As a result, the glass is broken by thermal stress due to the temperature distribution. In order to prevent the breakage of glass, it is necessary to increase the thermal shock resistance of the glass.

The thermal shock resistance R is represented by $$R = \frac{(1 - \mu)\kappa S}{\alpha E} \quad (1)$$

wherein $\mu$ is a Poisson ratio, $\kappa$ is a thermal conductivity, S is a rupture strength (bending strength), $\alpha$ is a coefficient of thermal expansion and E is a Young's modulus.

The factors $\kappa$, $\mu$, $\alpha$ and E are constants for a given substance. It can be seen, therefore, that to increase the thermal shock resistance of glass having a given composition, it is sufficient to increase the rupture strength of the glass.

Several techniques have been proposed to increase the thermal shock resistance of glass. A typical example is a chemical strengthening method of the surface of glass by ion exchange. This chemical strengthening method, however, can be applied only to specifically formulated glass compositions and cannot be applied to other glass compositions such as a phosphate laser glass composition formulated in view of the high repetitive operation characteristics. Another problem of the chemical strengthening method is that the compression stress layer formed on the surface of glass by the ion exchange process, when the temperature of the glass rises, disappears due to migration of ions.

SUMMARY OF THE INVENTION

The present invention is intended to overcome the above-described problems of the prior art, and the object of the present invention is a method of increasing the thermal shock resistance of a phosphate laser glass.

The object can be attained by forming a glassy coating on the surface of phosphate laser glass by coating a partially polycondensed sol solution prepared from metal alkoxide, for example, followed by heat treatment of the coated layer.

The method of increasing the thermal shock resistance of phosphate laser glass according to the present invention comprises (1) coating the surface of the phosphate laser glass with a sol solution which is prepared by hydrolyzing and partially polycondensing at least one organometallic compound dissolved in an organic solvent and then (2) heat treating the thus-formed coating film to form a glassy layer.

DETAILED DESCRIPTION OF THE INVENTION

Organometallic compounds which can be used are compounds containing metallic elements capable of forming glass, such as Si, B, Na or Al and so on. For example, when a glassy coating consisting of a single component of $SiO_2$ is formed, alkyl silicates and the like are used, and when a glassy coating consisting of three components of $SiO_2$-$B_2O_3$-$Na_2O$ is formed, a mixture of ethyl silicate, methyl borate and sodium methylate is used.

As the organic solvent, alcohol and acetyl acetone are generally used. Examples of the alcohol are methyl alcohol, ethyl alcohol, n-propyl alcohol, isopropyl alcohol and the like.

At least one of the above organometallic compounds is dissolved in the organic solvent and thoroughly mixed. Thereafter, water for hydrolysis is added as such or in the form that it is diluted with an organic solvent, and the resulting mixture is stirred to achieve hydrolysis and polycondensation. In this case, the concentration of the organometallic compound in the solution is controlled within the range of from 0.1 to 5 mole/kg. If the concentration is less than 0.1 mole/kg, a coating film having a sufficiently high thickness cannot be obtained. On the other hand, if it is more than 5 mole/kg, the rate of the polycondensation reaction following the hydrolysis is too high and, as a result, the solution is solidified into a jelly-like product. Thus, such a solution cannot be used as a coating solu- tion.

The ratio of the organometallic compound to water is also an important factor for preparation of a suitable coating solution. Although the amount of water to be added for hydrolysis varies depending upon the type of the organometallic compound, it is preferable in an amount of from 1 to 5 moles per mole of the organometallic compound. If the amount of water added is less than 1 mole per mole of the organometallic compound, an extremely long reaction time is required to obtain a partially polycondensated sol solution capable of being coated. On the other hand, if the amount of water added is more than 5 moles per mole of the organometallic compound, the resulting solution gels rapidly and a stable coating solution is difficult to prepare.

The sol solution preapred by hydrolyzing with a suitable amount of water and partially polycondensating by aging can be coated on the surface of the phosphate laser glass in any suitable manner. For example, the phosphate laser glass is dipped in the sol solution. By sintering the thus-coated layer under heat treatment conditions as shown in the Examples as described hereinafter, the desired glassy coating can be obtained.

The method of the present invention permits to increase the thermal shock resistance of phosphate laser glass. The reason for this is believed due to the fact that fine cracks in the surface of the glass are covered with the glassy coating, rather than the formation of the surface compression stress layer as in the ion exchange method. This is based on the experimental results as shown in the Examples that in comparing the $SiO_2$ glass coating with the $SiO_2$-$B_2O_3$-$Na_2O$ glass coating, the $SiO_2$ glass coating having a low coefficient of thermal expansion, i.e., it is assumed to have a high compression stress layer formed thereon, does not always have a higher thermal shock resistance.

The present invention is described in greater detail by reference to the following Examples, although it is not intended to be limited thereto.

EXAMPLE 1

An ethyl alcohol solution of ethyl silicate was hydrolyzed and then allowed to stand at room temperature to cause partial polycondensation, thereby obtaining a coating solution. A phosphate laser glass rod having a diameter of 5 mm and a length of 40 mm, which had been subjected to polished finishing, was dipped in the resulting coating solution and taken out. The thus-coated layer was dried at room temperature, gradually heated to up to 350° C., and maintained at this temperature for 5 hours to obtain a glassy coating. The rupture strength of the glass rod having provided thereon the glassy coating was 1,400 kg/cm². On the other hand, the rupture strength of the glass rod not having the glassy coating was 670 kg/cm². Thus, it can be seen that the rupture strength was increased to about 2.1 times the original strength. Similarly, the thermal shock resistance as calculated from the equation (1) is 2.1 times the original value.

EXAMPLE 2

A phosphate laser glass rod having a diameter of 5 mm and a length of 40 mm, which had been subjected to polished finishing, was coated in the same manner as in Example 1. The rupture strength of the glass rod having provided thereon the glassy coating was 1,900 kg/cm². On the other hand, the rupture strength of the glass rod not having the glassy coating was 900 kg/cm². Thus, it can be seen that the rupture strength was increased to about 2.1 times the original strength. Further, the thermal shock resistance was about 2.1 times the original value.

EXAMPLE 3

An ethyl alcohol solution of a mixture of ethyl silicate, methyl borate and sodium methylate was hydrolyzed and partially polycondensed to prepare a coating solution. A phosphate laser glass having a diameter of 5 mm and a length of 40 mm, which had been subjected to polished finishing, was coated by dipping in the coating solution. The thus-coated layer was dried at room temperature, gradually heated to up to 380° C., and maintained at that temperature for 24 hours. Thus, a glassy coating was obtained. The rupture strength of the glass rod having provided thereon the glassy coating was 2,000 kg/cm². On the other hand, the rupture strength of the glass rod not having the glassy coating was 900 kg/cm². Thus, it can be seen that the rupture strength was increased to about 2.2 times the original strength. Further, thermal shock resistance was about 2.2 times the original value.

EXAMPLE 4

A phosphate laser glass having a size of 5 mm×5 mm×40 mm, which had been subjected to ground finishing at the sides, was coated in the same manner as in Example 1. The thus-coated layer was maintained at 400° C. for 2 hours to form a glassy coating. The rupture strength of the glass having provided thereon the glassy coating was 920 kg/cm². On the other hand, the rupture strength of the glass bar not having the coating was 520 kg/cm². Thus, it can be seen that the rupture strength of the glass was increased to about 1.8 times the original strength. Further, the thermal shock resistance was also about 1.8 times the original value.

EXAMPLE 5

An isopropanol solution of a mixture of ethyl silicate, methyl borate, sodium methylate and aluminum isopropoxide was hydrolyzed and partially polycondensed to prepare a coating solution. A phosphate laser glass having a diameter of 5 mm and a length of 40 mm, which had been subjected to polished finishing, was coated by dipping in the coating solution. The thus-coated layer was dried at room temperature, gradually heated to up to 400° C., and maintained at that temperature for 12 hours. Thus, a glassy coating was obtained. The rupture strength of the glass rod having provided thereon the glassy coating was 1,700 kg/cm². On the other hand, the rupture strength of the glass rod not having the glassy coating was 800 kg/cm². Thus, it can be seen that the rupture strength of the glass rod was increased to about 2.1 times the original strength. Further, the thermal shock resistance was also about 2.1 times the original value.

The results are shown in the Table below together with the results of the other Examples.

TABLE

| Example | Shape of Glass | Degree of Surface Finishing | Composition of Glassy Coating | Heat Treatment Conditions | Rupture Strength (kg/cm²) Without Glassy Coating | Rupture Strength (kg/cm²) With Glassy Coating | Thermal Shock Resistance (kcal/m · hr) Without Glassy Coating | Thermal Shock Resistance (kcal/m · hr) With Glassy Coating |
|---|---|---|---|---|---|---|---|---|
| 1 | 5φ × 40 mm | Polished Finishing | $SiO_2$ | 350° C., 5 hrs | 670 | 1,400 | 38 | 80 |
| 2 | 5φ × 40 mm | Polished Finishing | $SiO_2$ | 350° C., 5 hrs | 900 | 1,900 | 67 | 141 |
| 3 | 5φ × 40 mm | Polished Finishing | $SiO_2$—$B_2O_3$—$Na_2O$ | 380° C., 24 hrs | 900 | 2,000 | 67 | 148 |
| 4 | 5 × 5 × 40 mm | Ground Finishing | $SiO_2$ | 400° C., 2 hrs | 520 | 920 | 30 | 52 |
| 5 | 5φ × 40 mm | Polished Finishing | $SiO_2$—$B_2O_3$—$Na_2O$—$Al_2O_3$ | 400° C., 12 hrs | 800 | 1,700 | 60 | 126 |
| 6 | 5 × 5 × 40 mm | Polished Finishing | $SiO_2$ | 400° C., 2 hrs | 580 | 1,150 | 33 | 66 |
| 7 | 5φ × 40 mm | Polished Finishing | $SiO_2$—$B_2O_3$—$Na_2O$ | 380° C., 24 hrs | 670 | 1,650 | 38 | 94 |

TABLE-continued

| Example | Shape of Glass | Degree of Surface Finishing | Composition of Glassy Coating | Heat Treatment Conditions | Rupture Strength ($kg/cm^2$) | | Thermal Shock Resistance ($kcal/m \cdot hr$) | |
|---|---|---|---|---|---|---|---|---|
| | | | | | Without Glassy Coating | With Glassy Coating | Without Glassy Coating | With Glassy Coating |
| 8 | 5φ × 40 mm | Polished Finishing | $SiO_2$ | 260° C., 15 hrs | 670 | 1,150 | 38 | 66 |
| 9 | 5φ × 40 mm | Polished Finishing | $SiO_2$ | 260° C., 15 hrs | 900 | 1,350 | 67 | 100 |
| 10 | 5φ × 40 mm | Ground Finishing | $SiO_2$ | 350° C., 5 hrs | 750 | 1,170 | 55 | 87 |
| 11 | 5φ × 40 mm | Ground Finishing | $SiO_2$—$B_2O_3$—$Na_2O$ | 380° C., 24 hrs | 750 | 1,200 | 55 | 89 |

Note
φ: Diameter

While the invention has been described in detail and with reference to specific embodiments thereof, it will be apparent to one skilled in the art that various changes and modifications can be made therein without departing from the spirit and scope thereof.

What is claimed is:

1. A method of increasing the thermal shock resistance of a phosphate laser glass which comprises coating the surface of the phosphate laser glass with a sol solution which is prepared by hydrolyzing at least one organometallic compound dissolved in an organic solvent and then partially polycondensing and heat treating the thus-formed coating film to form a glassy coating on the surface of the phosphate laser glass.

2. The method as claimed in claim 1, wherein a metallic element which constitutes the organometallic compound is a metallic element capable of forming glass.

3. The method as claimed in claim 1, wherein the metallic element is at least one selected from the group consisting of Si, B, Na and Al.

4. The method as claimed in claim 1, wherein the organic solvent is an alcohol or acetyl acetone.

5. The method as claimed in claim 1, wherein the concentration of the organometallic compound in the solution is from 0.1 to 5 mole/kg.

6. The method as claimed in claim 1, wherein the hydrolysis is conducted by adding water.

7. The method as claimed in claim 6, wherein the amount of water added is 1 to 5 moles per mole of the organometallic compound.

* * * * *